Apr. 17, 1923.
E. P. LARSH
1,451,701
LUBRICATING APPARATUS
Original Filed Nov. 27, 1916
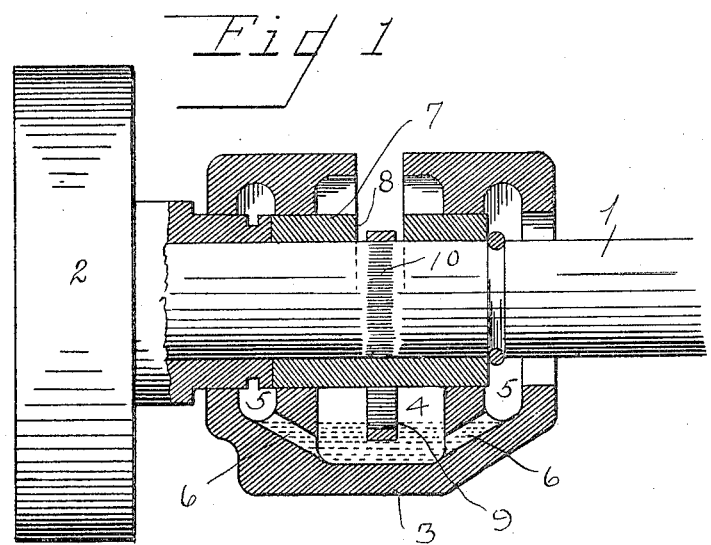
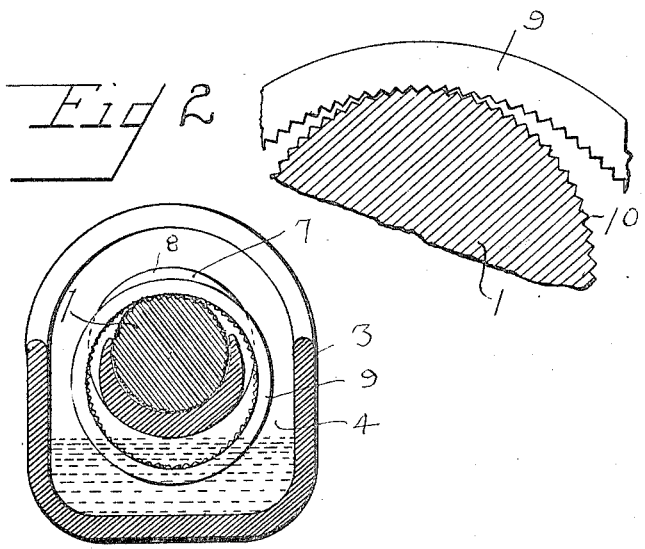
INVENTOR
Everett P. Larsh
BY
H. P. Walker
ATTORNEYS.

Patented Apr. 17, 1923.

1,451,701

UNITED STATES PATENT OFFICE.

EVERETT P. LARSH, OF DAYTON, OHIO, ASSIGNOR, BY MESNE ASSIGNMENTS, TO THE DURO PUMP AND MANUFACTURING COMPANY, OF DAYTON, OHIO, A CORPORATION OF OHIO.

LUBRICATING APPARATUS.

Original application filed November 27, 1916, Serial No. 133,727. Divided and this application filed July 5, 1921. Serial No. 482,419.

*To all whom it may concern:*

Be it known that I, EVERETT P. LARSH, a citizen of the United States, residing at Dayton, in the county of Montgomery and State of Ohio, have invented certain new and useful Improvements in Lubricating Apparatus, of which the following is a specification.

This invention relates to improvements in lubricating means for machine elements particularly shafts or other rotary members, and contemplates the use of a rotating oil ring, having a more or less positive driving connection with the shaft to be lubricated.

The invention was originally described, shown and claimed in my co-pending application for Letters Patent, Serial No. 133727, filed November 27, 1916, of which application the present matter is a division.

The object of the invention is to simplify the structure as well as the means and mode of operation of oil ring lubricators whereby they will not only be cheapened in construction, but will be more efficient in operation, uniform in action, automatic in operation, easily installed and unlikely to get out of order.

A further object of the invention is to provide means for insuring the driving operation of the oil ring by the rotation of the lubricated shaft and to prevent undue wear of the parts, which as at present constructed decreases the efficiency and eventually prevents the operation of these oil rings.

A further object of the invention is to provide improved means for intercepting escaping lubricant or oil, and for returning the same to the reservoir, and to further provide an improved form of lubricating bearing.

With the above primary and other incidental objects in view as will more fully appear in the specification, the invention consists of the features of construction, the parts and combinations thereof and the mode of operation or their equivalents as hereinafter described and set forth in the claims.

Referring to the drawings, wherein is shown the preferred, but not necessarily the only embodiment of the invention, Fig. 1 is a longitudinal sectional view of a shaft bearing, containing a lubricant reservoir, and embodying the oil distributing means forming the subject matter hereof. Fig. 2 is a transverse sectional view on line 2—2 of Fig. 1.

Like parts are indicated by similar characters of reference throughout the several views.

While the oil ring or distributor herein shown and described will operate efficiently and successfully upon high speed shafts, it is particularly desirable for lubricating shafts or rotating bodies having a low rate of rotation. The lubricating means and bearing forming the subject matter hereof, and shown in the drawings is capable of a wide application to machines of different character, as pumping apparatus, hoisting apparatus, machine tools and various other structures, wherein rotary shafts are horizontally disposed. In the drawings, there is shown a shaft 1, to be lubricated, which carries a wheel or pulley 2. The revoluble shaft 1 in this instance is mounted in a bearing comprising the housing 3, separated into a main compartment or oil reservoir 4, and auxiliary compartments or collecting spaces 5 on opposite sides thereof and connected with the main reservoir 4 by inclined ducts 6. Positioned within the housing 3 and extending transversely across the main compartment or reservoir 4, and terminating at a point coincident with the lateral or auxiliary collecting compartment 5 is a bushing or sleeve 7, in which the shaft 1 is journalled. The bushing or sleeve 7 is slotted at its upper medial portion as indicated at 8 to expose the shaft therein. Suspended upon that portion of the shaft exposed thru the slot 8 is a rotary oil ring 9, free to rotate with the shaft 1. This oil ring 9 is circular in form and rides freely upon the exposed area of the shaft within the slot 8. The ring 9 being of greater diameter than the shaft and bushing or sleeve 7 the lower portion of the ring extends into the body of oil or lubricant contained in the lower portion of the main compartment or reservoir 4. As the oil ring 9 rotates a supply of oil clings to the ring and is continuously carried upward to the shaft and its bearing.

While oiling rings have heretofore been quite common in the art, it has been found that they have not been successfully employed without frequent attention on slow rotating shafts. Unless the shaft is operated at a high rate of speed, there is a tendency for the ring to hang inert. This is particularly true in the event that a heavy or dirty lubricant or oil is employed and especially if by wear the ring is slightly eccentric or untrue. In the event that the ring is clogged or for any reason inactive for a short period of time the increased wear at a given point upon the ring will tend to increase the tendency of the ring to remain inactive and therefore the difficulty, and progressively decrease its efficiency.

To overcome this tendency in the present construction, the path 10, of the oil ring 9 about the shaft 1 is knurled or finely serrated, preferably though not necessarily by a series of parallel indentations distributed about the periphery of the shaft. The interior cylindrical face of the ring 9 is correspondingly knurled or serrated to give to the shaft and ring sufficient bite or frictional engagement to insure a more or less positive and continuous operation of the oiling ring. This interengagement of the knurled or serrated faces of the ring and shaft affords a gear like feeding action, insuring its continuous rotation. The knurling or serrations of the interior of the ring has the further function of collecting oil or lubricant from the reservoir 4 and facilitates its elevation to the shaft bearing. Moreover, the interaction of the knurling or serrations of the ring and the shaft at their point of engagement, facilitates the transfer of oil or lubricant from the ring to the shaft and its bearing. In practice the knurling or roughening of the interior face of the ring and the ring passed about the shaft has been found to be of material advantage and improvement increasing greatly the efficiency of the usual method of ring oiling, as applied to shafts of whatever speed, but especially true when applied to slow speed shafts.

To prevent the discharge and loss of oil or lubricant by being carried upon the shaft 1, beyond the housing 19 and to collect the oil or lubricant which may ooze from the ends of the bearing sleeve 7, and insure its return to the reservoir 4, the shaft 1 is provided with a peripheral groove 12, adjacent to the end of the bushing or sleeve 7, in which is contracted a ring 13 preferably of wire. The outer circumference of this ring is of greater diameter than that of the shaft. The oil which may ooze from the end of the bushing or bearing 7 will be carried by centrifugal tendency to the periphery of the ring 13, and will be discharged therefrom into the auxiliary or collecting compartment 5 of the housing 3, from which the oil or lubricant is drained back to the reservoir 4 thru the ducts 6. A centrifugal tendency as the shaft is rotated will prevent the oil from creeping down the ring 13. This ring interrupts the passage of oil along the shaft and automatically discharges it back into the reservoir.

While a separate ring 13 may be located at each end of the bearing sleeve or bushing 7, similar to that shown at the right of Fig. 1, a flange 14 upon the hub of the wheel or pulley 2 may be made to serve the same purpose, as is illustrated at the left in Fig. 1. This wheel or pulley is fixedly secured to the shaft for rotation therewith. The extremity of the hub extends within the bearing housing 3 and is provided with a peripheral groove 16, thereby forming at the extremity of the hub the flange 14, from which the oil or lubricant is discharged by centrifugal tendency. The oil or lubricant will not pass the peripheral groove 16 inasmuch as centrifugal tendency will prevent the oil from traveling inwardly on the flange which would be necessary to the passage of the oil, beyond the housing. The knurling or roughening of the ring and its path of travel insures a continuous operation for long periods of time without attention, and increases the carrying capacity of the ring, and the supply of lubricants to the shaft 1. However, the knurled or roughened ring path upon the shaft increases the capacity of the shaft to take up and carry oil or lubricant from the ring to the bearing within the sleeve 7.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms, or modifications within the legitimate and valid scope of the appended claims.

Having thus described my invention, I claim:

1. In a construction of the character described, a revoluble shaft, an oil reservoir, and an oiling ring suspended upon the shaft, and extending within the oil reservoir, the ring path about said shaft being knurled and the interior periphery of the ring bearing also knurled, substantially as specified.

2. In a construction of the character described, a revoluble shaft, an oil reservoir, a normally inflexible oiling ring suspended within the reservoir from said shaft, a series of teeth or corrugations in the ring path about said shaft, and a series of similar teeth or corrugations upon the inner periphery of the oiling ring engaging with those of the shaft to drive the ring in unison with the rotation of the shaft.

3. In a construction of the character described, a revoluble shaft, an oil reservoir, a normally inflexible oiling ring suspended within the reservoir from said shaft and interengaging driving faces upon the shaft and the interior of the ring whereby the ring will be positively rotated by the rotation of the shaft.

In testimony whereof, I have hereunto set my hand this 4th day of May, A. D. 1921.

EVERETT P. LARSH.

Witnesses:
 EDGAR G. DENLINGER,
 GEORGE C. HELWIG.